United States Patent [19]

Thoma et al.

[11] 4,145,264

[45] Mar. 20, 1979

[54] PREPARATION OF METAL-FREE PHTHALOCYANINES

[75] Inventors: Peter Thoma, Frankenthal; Wolfgang Habermann, Mainz; Joachim Kranz, Ludwigshafen, all of Fed. Rep. of Germany

[73] Assignee: BASF Aktiengesellschaft, Rhineland-Pfalz, Fed. Rep. of Germany

[21] Appl. No.: 884,892

[22] Filed: Mar. 9, 1978

[30] Foreign Application Priority Data

Mar. 14, 1977 [DE] Fed. Rep. of Germany ....... 2711005

[51] Int. Cl.$^2$ ..................... C25B 3/04; C07D 207/00; C09B 47/04
[52] U.S. Cl. .................................. 204/59 R; 204/72; 204/74
[58] Field of Search ..................... 204/59 R, 74, 73 R, 204/72

[56] References Cited

U.S. PATENT DOCUMENTS

| | | | |
|---|---|---|---|
| 3,485,726 | 12/1969 | Misono et al. | 204/59 |
| 3,511,765 | 5/1970 | Beck et al. | 204/222 |

OTHER PUBLICATIONS

Introduction to Organic Electrochemistry by Rifi et al., pp. 236–239 pub. by Marcel Dekker, Inc. N.Y. 1974.

Primary Examiner—F.C. Edmundson
Attorney, Agent, or Firm—Oblon, Fisher, Spivak, McClelland & Maier

[57] ABSTRACT

Metal-free phthalocyanines (PC) are prepared by electrolysis, at inert electrodes, of aromatic o-dinitriles in organic liquids which contain small amounts of dissolved electrolytically conductive compounds, in the presence of hydrogen or of a compound which eliminates hydrogen under the reaction conditions and in the presence of alkaline compounds (as activators). The PC formed may be isolated in the pure form by filtration. The product contains from 90 to 99% of PC. It is used for the preparation of PC-based pigments.

19 Claims, No Drawings

PREPARATION OF METAL-FREE PHTHALOCYANINES

The present invention relates to a process for the preparation of metal-free phthalocyanines from aromatic o-dicarboxylic acid nitriles.

Direct and indirect methods of preparing metal-free phthalocyanines have been disclosed. Industrially, metal-free phthalocyanines are prepared by indirect processes, in which an alkali metal or alkaline earth metal phthalocyanine is first prepared and is then demetalized (U.S. Pat. Nos. 2,116,602 and 3,060,189). The indirect processes as a rule give higher yields of phthalocyanine but entail greater expenditure on labor and equipment.

Processes for the direct preparation of metal-free phthalocyanines, hereafter referred to as PC, are disclosed, for example, in U.S. Pat. No. 2,116,602 and British Pat. No. 410,814. According to these, o-phthalodinitrile is cyclized to PC in the presence of catalytic basic compounds.

Metal-free phthalocyanine can also be obtained, though only in uneconomical yields and/or in an impure form, by heating o-phthalodinitrile in polyols (German Pat. No. 696,334), o-cyanobenzamide (U.S. Pat. Nos. 2,000,051 and 2,000,052) and mixtures of phthalic anhydride, urea and ammonium salts in the presence of antimony catalysts (U.S. Pat. No. 2,820,796).

German Pat. No. 1,234,342 discloses a process for the preparation of PC by heating o-phthalodinitrile with hydrogen under high pressure.

It is an object of the present invention to provide a process for the preparation of metal-free phthalocyanine, by means of which aromatic o-dicarboxylic acid dinitriles can be converted in high yield, and with little expenditure on equipment, into the corresponding PC compounds.

We have found that this object is achieved and that metal-free phthalocyanine is obtained in high purity and good yields when a solution or suspension of one or more aromatic o-dinitriles in an organic liquid is electrolyzed in the presence of hydrogen or of a compound which eliminates hydrogen under the reaction conditions, and in the presence of one or more alkaline compounds as activators, using electrodes which are inert under the reaction conditions, the organic liquid containing small amounts of one or more dissolved electrolytically conductive compounds.

The PC produced during the electrolysis is as a rule obtained in the form of long needles which have a purity of 90% or more.

The purity of the product can be increased to 98-99% by selecting optimum conditions.

Suitable aromatic o-dinitriles for the process according to the invention are especially those derived from benzene and naphthalene, which aromatic radicals may contain further substituents, e.g. alkyl of 1 to 4 carbon atoms, phenyl, phenoxy, halogen, e.g. chlorine or bromine, or nitro. Mixtures of different o-dinitriles may also be used. Specific examples of aromatic o-dinitriles are o-phthalodinitrile, 4-chlorophthalodinitrile, tri- and tetra-chlorophthalodinitrile, methylphthalodinitrile, 4-phenylphthalodinitrile, 4-phenoxyphthalodinitrile, 2,3-naphthodinitrile, 4-nitrophthalodinitrile and 4-aminophthalodinitrile.

The process is in general carried out by adding the aromatic o-dinitrile to the organic liquid. Since it is essentially the dissolved dinitrile which undergoes the reaction, the dinitrile should be at least partially dissolved in the organic liquid at the reaction temperature. This condition can readily be fulfilled by selecting suitable organic liquids.

The organic liquid contains small amounts of dissolved electrically conductive compounds to ensure that the mixture is of sufficient conductivity for the electrolysis. After introducing the electrodes, the electrolysis is carried out with direct current and at the same time the mixture is mixed continuously and thoroughly, for example by stirring or by introduction of gas.

The voltage between the anode and cathode is advantageously regulated so as to give a current density at the cathode of from 500 to 10,000 A/m$^2$. It is also possible to use lower current densities, but in that case the space-time yield diminishes.

The voltage applied is also determined by the hydrogen overvoltage which manifests itself at the cathode and which depends on the cathode material. In order that there shall be no reduction of either the dinitrile or the PC formed, the hydrogen overvoltage should not exceed 1,500 mV (measured against a reversible hydrogen electrode in the same organic liquid). If the electrolysis is carried out with a hydrogen overvoltage of up to 500 mV at the cathode, the yields of PC obtained are somewhat higher then with overvoltages of from 500 to 1,500 mV, but in the former case the PC produced is difficult to filter. Hence, the electrolysis is advantageously carried out under conditions such that the hydrogen overvoltage at the cathode is from 500 to 1,500 mV, since this gives suspensions which are particularly easy to filter.

It is furthermore necessary to ensure that the anode potential should not become greater than the oxidation potential of the organic liquid, since otherwise the o-dinitrile and the PC formed may undergo oxidation.

The electrolysis is advantageously not carried out until the dinitrile has been converted quantitatively, but only to a conversion of 75% or less, preferably to a conversion of from 25 to 50% of the dinitrile. This achieves a substantially higher current efficiency and at the same time a substantially higher space-time yield than if the conversion of the dinitrile is in the range from 75% to quantitative conversion, since the current efficiency drops substantially with increasing depletion of dinitrile in the liquid. When the process according to the invention is carried out industrially, the electrolysis is preferably only taken to a theoretical current conversion of from 25 to 45%, based on dinitrile.

Since the liquid from which the PC has been separated off is re-used, after replenishing the constituents which have been consumed or have separated out with the PC, e.g. dinitrile, electrolytically conductive compounds and activators, no starting material is lost if the conversion is carried out non-quantitatively. However, using non-quantitative conversion a high current efficiency and, at the same time, a high space-time yield, is achieved, and hence this embodiment of the process is preferred.

Since the reaction takes place substantially more rapidly at elevated temperatures, the electrolysis is advantageously carried out at above 40° C. The upper temperature limit is determined, when working at atmospheric pressure, by the boiling point of the organic liquid. However, the process can also be carried out under superatmospheric pressure and hence at above the boiling point of the liquid. Preferably, it is carried out at from 60° C. to the boiling point of the organic liquid, especially at from 80° to 120° C., if necessary under superatmospheric pressure.

Suitable organic liquids are, especially, primary, secondary and tertiary alkanols of 1 to 12 carbon atoms, where the alkane radical may be linear or branched. Other suitable organic liquids are alkanediols of 2 to 6 carbon atoms, alkanetriols of 3 to 6 carbon atoms, polyalkanediols, where alkane is of 2 to 6 carbon atoms, polyalkanetriols, where alkane is of 3 to 6 carbon atoms, saturated cyclic ethers of 4 or 5 carbon atoms, and N-alkylamides and N,N-dialkylamides, where alkyl is of 1 to 4 carbon atoms, of aliphatic carboxylic acids of 1 to 3 carbon atoms, lactams of 4 to 6 carbon atoms and their N-alkyl derivatives, where alkyl is of 1 to 4 carbon atoms.

Further suitable liquid media are aromatic benzene hydrocarbons, e.g. benzene, toluene and xylene, and chlorinated benzene hydrocarbons, e.g. chlorobenzene, o-dichlorobenzene, trichlorobenzene, chlorotoluene and the chloroxylenes.

Specific examples of organic liquids are:

($\alpha$) Alkanols of 1 to 12 carbon atoms: methanol, ethanol, propanol, isopropanol, butanol, isobutanol, sec.-butanol, tert.-butanol, amyl alcohol, isoamyl alcohol, sec.-amyl alcohol, n-hexanol, isohexanol, n-heptanol, isoheptanol, n-octanol, isooctanol, 2-ethyl-hexanol, n-nonanol, isononanol, n-decanol, isodecanol, n-dodecanol and isododecanol.

($\beta$) Alkanediols of 2 to 6 carbon atoms and alkanetriols of 3 to 6 carbon atoms and their polyethers: ethylene glycol, diethylene glycol, triethylene glycol, polyethylene glycols, containing from 4 to 6 glycol units, 1,2-propylene glycol 1,3-propylene glycol, dipropylene glycol, polypropylene glycols containing from 3 to 6 propylene glycol units, glycerol, butane-1,2,4-triol, 1,4-butanediol, 1,3-butanediol, 1,5-pentanediol and 1,6-hexanediol.

($\gamma$) Cyclic ethers: tetrahydrofuran, hydropyran and dioxane.

($\delta$) Aliphatic carboxylic acid amides of 1 to 3 carbon atoms, and lactams (= cyclic carboxylic acid amides): formamide, N-methylformamide, N,N-dimethylformamide, N-ethylformamide, N,N-diethylformamide, N,N-dipropylformamide, N,N-dimethylacetamide, N,N-diethylacetamide, N,N-dipropylacetamide, N,N-dimethylpropionamide, N,N-dipropylpropionamide, pyrrolidone, N-methylpyrrolidone, N-methylcaprolactam, N-ethylcaprolactam, N-butylcaprolactam and N-propylcaprolactam.

Mixtures of different liquids can also be used as the reaction medium.

Amongst the organic liquids mentioned, the alkanols of 1 to 6 carbon atoms are preferred. Amongst these, in turn, those of 3 to 6 carbon atoms, e.g. propanol, isopropanol, n-butanol, sec.-butanol, isobutanol, tert.-butanol, n-hexanol, sec.-hexanol and isohexanol are particularly preferred, since high yields of PC are obtained by using them as the reaction medium, and since the reaction mixture can be worked up by filtering and simple drying to remove the organic liquid adhering to the PC.

The amount of organic liquid is not critical and can therefore be varied within wide ranges. The minimum amount of organic liquid is determined by the fact that it must be possible to mix the reaction mixture thoroughly before, during and after the reaction.

As a rule, the amount by weight of organic liquid used is from 4 to 40 times, preferably from 10 to 20 times, that of the o-dinitrile used.

Since, under the conditions of the electrolysis, the aromatic dinitriles are hydrolyzed by water to give phthalimide, it is advantageous to use organic liquids which contain very little or no water. Advantageously, the water content should be less than 0.1% by weight, based on the organic liquid. If it is more, the hydrolysis substantially reduces the yield of product.

In order that the organic liquid shall be of sufficient conductivity for the electrolysis, the liquid organic phase contains small amounts of electrolytically conductive compounds. These amounts are as a rule from 0.001 to 5, preferably from 0.01 to 3, especially from 0.1 to 1, percent by weight, based on the organic liquid.

Suitable electrolytically conductive compounds are ionic organic and inorganic compounds which are sufficiently soluble for the stated purpose in the organic liquids, and the cations and anions of which do not react, under the electrolysis conditions, with the o-dinitrile, the PC formed or the organic liquid.

Examples of suitable electrolytically conductive compounds are:

(a) Salts of quaternary ammonium bases and ammonium salts, e.g. tetraalkylammonium salts, tris(hydroxyalkyl)-alkylammonium salts, tetra(hydroxyalkyl)ammonium salts, and salts of primary, secondary or tertiary alkylamines or hydroxyalkylamines, where alkyl is of 1 to 20 carbon atoms, hydroxyalkyl is of 2 or 3 carbon atoms, and the substituents may be identical or different. The anions contained in these ammonium salts are those of hydrochloric acid, of sulfuric acid, of alkane sulfonic acids of 1 to 8 carbon atoms, of benzenesulfonic acid, of alkylbenzenesulfonic acids, where alkyl is of 1 to 9 carbon atoms, or alkylsulfuric acids (sulfuric acid halfesters of alkanols), where alkyl is of 1 to 5 carbon atoms, of monoalkylphosphoric or dialkylphosphoric acids, where alkyl is of 1 to 18 carbon atoms, or of mixtures of these.

(b) $NH_4^{\oplus}$ salts, alkali metal salts or alkaline earth metal salts of benzenesulfonic acid, of alkylbenzenesulfonic acids, where alkyl is of 1 to 18 carbon atoms, of naphthalenesulfonic acid, of alkylnaphthalenesulfonic acids, where alkyl is of 1 to 8 carbon atoms, of alkanesulfonic acids, where alkane is of 1 to 6 carbon atoms, of chloroalkanesulfonic acids of 2 to 6 carbon atoms, of hydroxyalkanesulfonic acids of 2 to 6 carbon atoms, of alkylsulfuric acids of 1 to 6 carbon atoms, of chloroalkylsulfuric acids of 2 to 6 carbon atoms, of the monoalkyl esters and dialkyl esters (where alkyl is of 1 to 18 carbon atoms) of boric acid or phosphoric acid, of the cyclic esters of boric acid with 1,2-diols of 2 to 8 carbon atoms or 1,3-diols of 3 to 8 carbon atoms, and of dicarboxylic acids, containing sulfonic acid groups, of a total of 4 to 6 carbon atoms;

(c) Alkanolates of 1 to 12 carbon atoms, glycollates of 2 to 6 carbon atoms, hydroxides, amides, sulfides, thiocyanates and cyanides of the alkali metals and the alkaline earth metals and (d) Chlorides of the alkaline earth metals and alkali metals, where these are soluble in the organic liquids used, e.g. magnesium chloride and lithium chloride.

A precondition of the suitability of the compounds is that they are soluble, in the abovementioned amount, in the organic liquids used.

Examples of cations of the above ammonium compounds (a) are tetramethylammonium, tetraethylammonium, tetrapropylammonium, tetrabutylammonium, dodecyltrimethylammonium, trimethylethylammonium, trimethyl-butylammonium, trimethyl-hexylammonium, trimethylammonium, triethylammonium, tripropylammonium, tributylammonium, dimethylammonium, diethylammonium, dipropylammonium, dibutylammonium, dihexylammonium, dioctylammonium, methylammonium, ethylammonium, propylammonium, butylammonium, hexylammonium, octylammonium, decylammonium, dodecylammonium, hexadecylammonium, octadecylammonium, ethanolammonium, diethanolammonium, triethanolammonium, propanolammonium and dipropanolammonium.

Examples of anions for use with these ammonium ions are bisulfate, sulfate, chloride, benzenesulfonate, o- and p-toluenesulfonate, ethylbenzenesulfonate, propylbenzenesulfonate, butylbenzenesulfonate, hexylbenzenesulfonate, octylbenzenesulfonate and nonylbenzenesulfonate, methanesulfonate, ethanesulfonate, propanesulfonate, butanesulfonate, pentanesulfonate and hexanesulfonate, methylsulfate, ethylsulfate, propylsulfate and butylsulfate, monododecylphosphate, monoheptadecylphosphate and bis-(2-ethylhexyl)-phosphate.

Examples of suitable alkali metal ions and alkaline earth metal ions for the groups mentioned under (b) and (c) are especially those of sodium, potassium, lithium, calcium and magnesium.

Specific examples of the sulfonic acids mentioned under (b) are benzenesulfonic acid, naphthalenesulfonic acid and, amongst alkylbenzenesulfonic acids, where alkyl is of 1 to 18 carbon atoms, those derived from toluene, ethylbenzene, propylbenzene, butylbenzene, hexylbenzene, octylbenzene, nonylbenzene, decylbenzene, dodecylbenzene, tetradecylbenzene, hexadecylbenzene and octadecylbenzene. Amongst these, the alkylbenzenesulfonic acids where alkyl is of 1 to 8 carbon atoms are preferred.

Examples of alkylnaphthalenesulfonic acids are, for example, methylnaphthalenesulfonic acid and butylnaphthalenesulfonic acid.

Examples of alkanesulfonic acids and chloroalkanesulfonic acids are methanesulfonic acid, ethanesulfonic acid, propanesulfonic acid, chloropropanesulfonic acid, butanesulfonic acid, chlorobutanesulfonic acid, pentanesulfonic acid and hexanesulfonic acid, and examples of alkylsulfuric acids and chloroalkylsulfuric acids are methylsulfuric acid, ethylsulfuric acid, propylsulfuric acid, chloropropylsulfuric acid, butylsulfuric acid, chlorobutylsulfuric acid and hexylsulfuric acid.

Suitable hydroxyalkanesulfonic acids, where alkane is of 2 to 6 carbon atoms, are especially those where the hydroxyl is in the $\beta$-position. Specific examples are $\beta$-hydroxyethanesulfonic acid, $\beta$-hydroxypropanesulfonic acid, $\beta$-hydroxybutanesulfonic acid and $\beta$-hydroxyhexanesulfonic acid.

Examples of suitable monoalkylphosphoric acids and dialkylphosphoric acids are monododecylphosphoric acid, monoheptadecylphosphoric acid, bis-(2-ethylhexyl)-phosphoric acid and mono-2-ethylphosphoric acid, these acids being preferably used in the form of the alkali metal salts or alkylammonium salts.

Examples of dicarboxylic acids containing sulfonic acid groups are sulfosuccinic acid and sulfoglutaric acid.

Mixtures of 2 or more of the electrolytically conductive compounds can also be used.

Electrolytically conductive compounds preferably used in the process according to the invention are the tetraethylammonium salts of ethylsulfuric acid, of o- and p-toluenesulfonic acid, of p-butylbenzenesulfonic acid and of p-hexylbenzenesulfonic acid, the sodium and potassium salts of propanesulfonic acid, chloropropanesulfonic acid, butanesulfonic acid and hexanesulfonic acid, the sodium and potassium salts of $\beta$-hydroxyethanesulfonic acid, $\beta$-hydroxypropanesulfonic acid, $\beta$-hydroxybutanesulfonic acid and $\beta$-hydroxyhexanesulfonic acid, the potassium and sodium salts of methylsulfuric acid, ethylsulfuric acid, propylsulfuric acid, chloropropylsulfuric acid, butylsulfuric acid and hexylsulfuric acid (i.e. the potassium or sodium salts of the sulfuric acid half-esters of ethanol, propanol, butanol and hexanol), the sodium and potassium salts of sulfosuccinic acid, and sodium hydroxide and potassium hydroxide.

In the process according to the invention, the electrolysis is, in addition, carried out in the presence of alkaline agents as activators for the o-dinitrile. Examples of suitable activators are alkali metal amides and alkaline electrolytically conductive compounds, e.g. alkali metal alcoholates, alkali metal sulfides, alkali metal hydroxides, alkali metal cyanides, alkali metal salts of monoalkylphosphoric and dialkylphosphoric acids (where alkyl is of 1 to 18 carbon atoms), alkali metal salts of the monoalkyl and dialkyl esters of boric acid, alkyl being of 1 to 18 carbon atoms, and alkali metal salts of cyclic boric acid esters with 1,2-diols and 1,3-diols, e.g. ethylene glycol, 1,2- and 1,3-propanediol and 1,2- 2,3- and 1,3-butanediol, and the alkali metal salts of dicarboxylic acids containing sulfonic acid groups. Amongst basic alkali metal salts, the lithium, potassium and sodium salts are preferred.

Suitable amides are potassium amide and lithium amide, and preferably sodium amide. Suitable alkanolates are in particular those of alkanols of 1 to 6 carbon atoms with potassium and lithium, and especially with sodium. Amongst these, sodium methylate, sodium ethylate, sodium propylate, sodium tert.-butylate and potassium tert.-butylate are particularly preferred, since they are easily accessible.

The amount of activator is in general from 0.1 to 1.0% by weight, based on the organic liquid. Preferably, from 0.3 to 0.5% by weight of activator is used. If an alkanol is used as the reaction medium for the process according to the invention, the use of an amide as activator results in the formation of the corresponding alcoholate, with evolution of ammonia. Where alkaline electrolytically conductive compounds are used as activators, they impart the requisite electrical conductivity to the reaction medium.

Examples of suitable compounds which split off hydrogen are easily dehydrogenated alkanols of 1 to 4 carbon atoms, e.g. methanol, propanol and isopropanol, lower aldehydes, e.g. formaldehyde or acetaldehyde, alkali metal borohydrides, e.g. lithium borohydride, sodium borohydride and potassium borohydride, lithium aluminum hydride, sodium cyanoborohydrides, aminoboranes, sodium aluminum bis-(2-methoxy-ethoxy)-dihydride, 9-borabicyclo(3,3,1)-nonane and lithium trimethoxyborohydride. The alkali metal borohydrides can also be used in the presence of hydrogen. Preferably, the reaction is carried out in the presence of hydrogen introduced as a finely dispersed gas into the reaction mixture.

The yields of PC from the process according to the invention can be improved by adding esters of alkanols of 1 to 6 carbon atoms with fatty acids of 2 to 4 carbon atoms to the organic liquid. The amount of these esters can be up to 10% by weight, based on the organic liquid. Preferably, the esters are employed in amounts of from 0.5 to 5% by weight, based on the organic liquid. The addition of more than 10% by weight is in general not detrimental to the process, but produces no advantages compared to the addition of from 0.5 to 5% by weight.

Amongst the fatty acid esters, those of the alkanols of 2 to 4 carbon atoms, e.g. ethyl, isopropyl, propyl, n-butyl, isobutyl, tert.-butyl and sec.-butyl propionate, butyrate and acetate are preferred. Since the acetate esters result in the greatest increase in yield, they are particularly preferred additives.

The yield of PC can also be increased by adding from 0.02 to 0.15, preferably from 0.03 to 0.1,% by weight, based on the organic liquid, of lead-II acetate or lead-IV acetate.

The electrodes used for the process according to the invention must be inert under the reaction conditions, i.e. they must not dissolve and must react neither with the o-dinitrile nor with the resulting PC, for example must not form complexes. Accordingly, the materials to be used for the cathode and for the anode have to conform to a variety of requirements.

Examples of suitable inert materials for the cathode are titanium, zirconium, tantalum, graphite, stainless steels, brass, copper, silver, gold, zinc, tin and antimony; titanium, tantalum, aluminum, graphite, copper, silver or stainless steel which have been surface-coated with nickel borides, titanium borides, zirconium borides or tantalum borides; and sheets or rods produced from nickel borides, tantalum borides, titanium borides or zirconium borides.

Other inert materials which can be used for the cathode are other borides, nitrides, silicides and carbides of metals of sub-groups IV to VI of the periodic table.

Preferably, the materials used as the cathode exhibit a hydrogen overvoltage, in the reaction medium used, of not more than 1,500 mV (measured against a reversible hydrogen electrode in the same medium) in order to avoid hydrogenation of double bonds and nevertheless to achieve good electron transfer.

For this reason, copper, silver, gold, tantalum, titanium and stainless steels are particularly suitable cathode materials and are therefore preferred.

For the anode, a conductive material which does not undergo anodic oxidation, accompanied by dissolution, under the reaction conditions, is used. Examples of suitable materials which are inert under these conditions are graphite and glassy carbon (Sigradur; trade mark); the carbides and borides of nickel, titanium, zirconium and tungsten; the platinum metals; titanium, tungsten oxide, molybdenum oxide and molybdenum carbide coated or modified with platinum metals or with gold; activated nickel and activated cobalt.

Other suitable anode materials are carbides, borides, silicides and nitrides of other metals of sub-groups IV to VI of the periodic table, as well as silicon carbide and boron carbide modified with metals of sub-group VIII of the periodic table or with gold.

Preferred anode materials are nickel borides, activated nickel, activated cobalt, graphite and the platinum metals, tungsten oxides, molybdenum oxides, tungsten carbides, molybdenum carbides, zirconium borides and zirconium carbides, modified with metals of sub-group VIII or with gold, and platinum-modified titanium.

The electrodes may consist entirely of the stated materials. Alternatively, the latter may be applied as a layer to an electrically conductive base.

Of the stated materials, the modified oxides, and activated nickel and cobalt, can only be used as the anode in the presence of hydrogen.

The electrodes may be in the form of sheets, rods, perforated sheets, tubes, mesh, expanded metal mesh, granules, wool or finely particulate material.

Preferably, for example, the anode and cathode are in the form of sheets and are employed in filter press cells, capillary gap cells and stacked plate cells. It is also possible to use tubular cells, in which it is advantageous if the inner surface of the outer tube is the anode and a centrally located rod or tube is the cathode.

In a further advantageous embodiment of the cell, the anode and cathode are in the form of expanded metal mesh or perforated sheets, and during the electrolysis the reaction mixture flows through the electrodes.

A particularly advantageous arrangement is as a multitier cell, in which the anode and cathode, separated by an interspace, alternate. In this cell, the cathode and anode are preferably in the form of expanded metal mesh or of perforated sheets.

In fluidization processes, granules and other finely particulate material are used as the electrode material, electrical contact with the fluidized particles or granules being made by rods protruding into the fluidizing chamber. These rods then also serve as electrodes.

The Examples which follow illustrate the process of the invention. Percentages are by weight.

The specific surface area (BET surface area) was determined by the method of S. Brunauer, P. H. Emmett and E. Teller, J. Amer. Chem. Soc. 60 (1938), 309. In each case, the hydrogen overvoltage was measured against a reversible hydrogen electrode in a medium which had the same composition as the reaction mixture.

EXAMPLE 1

A solution of 100 g of o-phthalodinitrile, 900 g of isobutanol, 2.5 g of sodium methylate and 20 g of tetraethylammonium ethyl-sulfate is introduced into an electrolysis cell which contains an RA2 cathode and a graphite anode (of surface area 50 cm$^2$) coated with nickel boride. The electrolysis is carried out at 90° C., with a current density of 2,000 A/m$^2$ (at the cathode), whilst passing hydrogen into the medium. The hydrogen overvoltage is less than 500 mV.

The reaction is terminated after 12 A.h. 85 g of metal-free phthalocyanine (PC) in the form of needles are isolated from the reaction mixture. Purity: 95%, specific surface area, by the BET method, 7–8 m$^2$/g.

| | $C_{32}H_{18}N_8$ (molecular weight 514.6) | | |
|---|---|---|---|
| | C | H | N |
| Calculated | 74.7 | 3.5 | 21.8% |
| Found | 74.6 | 3.8 | 21.5 |

EXAMPLE 2

The procedure described in Example 1 is followed, but instead of the graphite anode a titanium anode surface-coated with an alloy of 70% of platinum and 30% of iridium is used.

86 g of PC are isolated; the material is 96% pure and has a specific surface area of 6–7 m²/g.

| $C_{32}H_{18}N_8$ (molecular weight 514.6) | | | |
|---|---|---|---|
| | C | H | N |
| Calculated | 74.7 | 3.5 | 21.8% |
| Found | 74.4 | 3.7 | 21.7 |

EXAMPLE 3

The procedure described in Example 2 is followed, but instead of isobutanol the same amount of diethylene glycol is used. After working up, 82 g of PC are obtained. Purity 95%; specific surface area, by the BET method, 7 m²/g.

| $C_{32}H_{18}N_8$ (molecular weight 514.6) | | | |
|---|---|---|---|
| | C | H | N |
| Calculated | 74.7 | 3.5 | 21.8% |
| Found | 74.5 | 3.7 | 21.6% |

EXAMPLES 4 TO 9

The procedure described in Example 1 is followed, but instead of isobutanol the same amount of the organic liquids shown in the Table below is used.

| Example | Liquid | PC yield g | Purity of PC % |
|---|---|---|---|
| 4 | Glycol monomethyl ether | 90 | 94 |
| 5 | n-Butanol | 90 | 96 |
| 6 | n-Hexanol | 94 | 98 |
| 7 | Isooctanol | 90 | 92 |
| 8 | n-Nonanol | 86 | 90 |
| 9 | 1,4-Dioxane | 65 | 90 |

The surface area, measured by the BET method, of the PC obtained is 6 m²/g.

EXAMPLE 10

An electrolysis cell having a copper cathode (surface area: 50 cm²) and a graphite anode (surface area 50 cm²) is used. A solution of 90 g of 4-nitro-o-phthalodinitrile, 2.5 g of sodium methylate and 20 g of tetraethylammonium p-toluenesulfonate in 950 g of n-hexanol is electrolyzed at 90° C., with a cathodic current density of 800 A/m², whilst passing hydrogen into the mixture. The hydrogen overvoltage is not more than 400 mV.

Filtration gives 89 g of greenish-blue fine crystals, which contain 90% of tetranitrophthalocyanine.

| $C_{32}H_{14}N_{12}O_8$ (molecular weight 696.6) | | | | |
|---|---|---|---|---|
| | C | H | N | O |
| Calculated | 55.3 | 2.0 | 24.2 | 18.4% |
| Found | 55.2 | 2.8 | 23.8 | 18.8% |

EXAMPLE 11

The procedure described in Example 10 is followed, but 100 g of 4-phenyl-o-phthalodinitrile are used as the dinitrile and 1,000 g of isobutanol as the organic liquid. Temperature: 85° C., cathodic current density: 2,000 A/m².

After working up, 89 g of greenish-blue fine crystals are obtained, containing 90% of tetraphenylphthalocyanine.

| $C_{56}H_{34}N_8$ (molecular weight 818.9) | | | |
|---|---|---|---|
| | C | H | N |
| Calculated | 83.1 | 4.2 | 13.7% |
| Found | 82.0 | 4.3 | 13.5% |

EXAMPLE 12

The procedure described in Example 11 is followed, but diethylene glycol is used as the organic liquid. Cathodic current density: 1,500 A/m², temperature: 120° C.

Yield: 88 g of greenish-blue fine crystals, containing 94% of tetraphenylphthalocyanine.

| $C_{56}H_{34}N_8$ (molecular weight 818.9) | | | |
|---|---|---|---|
| | C | H | N |
| Calculated | 83.1 | 4.2 | 13.7% |
| Found | 81.4 | 4.2 | 13.5% |

EXAMPLE 13

The procedure described in Example 10 is followed, but a solution of 100 g of 4-chlorophthalodinitrile, 2 g of sodium amide and 25 g of the sodium salt of propanesulfonic acid in 900 g of isobutanol is used. Current density: 4,000 A/m² at the cathode; temperature: 95° C.; hydrogen overvoltage not more than 450 mV.

Yield: 95 g of greenish-blue crystals containing 90% of tetrachlorophthalocyanine.

| $C_{32}H_{12}N_8Cl_4$ (molecular weight) | | | | |
|---|---|---|---|---|
| | C | H | N | Cl |
| Calculated | 59.1 | 1.9 | 17.2 | 21.8% |
| Found | 57.9 | 2.2 | 16.8 | 22.5% |

EXAMPLE 14

The procedure described in Example 13 is followed, but 100 g of tetrachloro-o-phthalodinitrile are used. Temperature: 95° C.; cathodic current density: 4,000 A/m².

Yield: 71 of a green crystal powder containing 92% of hexadecachlorophthalocyanine.

| $C_{32}H_2N_8Cl_{16}$ (molecular weight 1,065.7) | | | |
|---|---|---|---|
| | C | N | Cl |
| Calculated | 35.1 | 10.5 | 53.2% |
| Found | 35.9 | 11.0 | 52.7% |

EXAMPLE 15

The procedure described in Example 10 is followed, but 80 g of an equimolar mixture of o-phthalodinitrile and 4-phenyl-o-phthalodinitrile are used, with 900 g of n-pentanol as the organic liquid. Temperature: 90° C.; cathodic current density: 1,000 A/m².

Yield: 75 g of a greenish-blue crystal powder containing 93% of diphenyl-phthalocyanine.

| $C_{44}H_{26}N_8$ (molecular weight 666.8) | | | |
|---|---|---|---|
| | C | H | N |
| Calculated | 79.3 | 3.9 | 16.8% |
| Found | 78.5 | 4.0 | 17.3% |

EXAMPLE 16

The procedure described in Example 1 is followed, but an RA2 expanded metal cathode and an anode consisting of nickel which has been surface-borided to a thickness of about 60 μm are used. After working up, 85 g of PC are obtained; purity 98.7%; specific surface area, by the BET method, 6 m²/g.

| $C_{32}H_{18}N_8$ (molecular weight 514.6) | | | |
|---|---|---|---|
| | C | H | N |
| Calculated | 74.7 | 3.5 | 21.8% |
| Found | 74.5 | 3.7 | 21.6% |

EXAMPLE 17

The procedure described in Example 1 is followed, but the same amount of sodium β-hydroxypropanesulfonate is used as the electrically conductive compound and n-propanol is used as the organic liquid. After working up, 93 g of PC are obtained; purity 95%; specific surface area 6 m²/g.

EXAMPLE 18

The procedure described in Example 1 is followed, but instead of sodium methylate and tetraethylammonium ethylsulfate, 10 g of sodium are used. After working up, 92 g of PC are obtained; purity 98.0%; specific surface area 6.5 m²/g.

| $C_{32}H_{18}N_8$ (molecular weight 514.6) | | | |
|---|---|---|---|
| | C | H | N |
| Calculated | 74.7 | 3.5 | 21.8% |
| Found | 74.4 | 3.6 | 21.7% |

EXAMPLE 19

An electrolysis cell fitted with an RA2 cathode and a graphite anode surface-coated with nickel boride (surface area: 50 cm²) contains a solution of 100 g of o-phthalodinitrile, 2.5 g of sodium methylate and 20 g of tetraethylammonium ethylsulfate in 720 g of isobutanol and 180 g of ethanol (as a hydrogen donor). The electrolysis is carried out at 80° C. with a current density of 2,000 A/m² at the cathode. The hydrogen overvoltage is less than 500 mV.

The reaction is terminated after 12 A.h. Yield: 60 g of PC; purity 88%; specific surface area, by the BET method, 5 m²/g.

| $C_{32}H_{18}N_8$ (molecular weight) | | | |
|---|---|---|---|
| | C | H | N |
| Calculated | 74.7 | 3.5 | 21.8% |
| Found | 74.1 | 3.5 | 21.5% |

EXAMPLE 20

A solution of 60 g of o-phthalodinitrile, 600 g of n-propanol, 2 g of Na chloropropyl-sulfate and 0.5 g of Na methylate is introduced into an electrolysis cell fitted with a nickel anode coated with nickel-III boride, and a brass cathode. The electrolysis is carried out at 85° C., with a current density of 1,800 A/m² of cathode area, whilst passing hydrogen into the mixture. After a theoretical current conversion of 90%, based on o-phthalodinitrile, 52 g of 97% pure phthalocyanine are obtained.

The filtrate can be re-electrolyzed after replacing the spent dinitrile and the sodium chloropropyl-sulfate and sodium methylate removed with the PC.

EXAMPLE 21

A solution consisting of 60 g of o-phthalodinitrile, 600 g of n-propanol, 1 g of sodium methylate and 5 g of sodium chloropropylsulfonate is electrolyzed, in the electrolysis cell described in Example 20 but using a graphite anode, to a theoretical current conversion of 80%, based on o-phthalodinitrile. The current density is 1,500 A/m². 44 g of phthalocyanine are isolated from the electrolyte; purity 95%.

The same result is obtained if the chloropropylsulfonate is replaced by the same amount of potassium xylenesulfonate or potassium toluenesulfonate.

EXAMPLE 22

An electrolyte of 65 g of o-phthalodinitrile, 600 g of n-propanol, 5 g of the sodium salt of sulfosuccinic acid and 1 g of sodium methylate is electrolyzed, in the electrolysis cell described in Example 20, at +88° C., using a cathodic current density of 1,800 A/m², to a theoretical current conversion of 90%m based on o-phthalodinitrile. 56 g of 97% pure phthalocyanine are isolated from the reaction mixture by filtration. 58 g of o-phthalodinitrile are added to the filtrate and the resulting solution is electrolyzed. After introducing the same amount of current, the mixture is again filtered; yield, 56 g of 96.5% pure phthalocyanine.

EXAMPLE 23

(a) A solution consisting of 70.6 g of o-phthalodinitrile, 1,000 g of n-propanol, 1.5 g of sodium propylate and 3.53 g of tetraethylammonium ethyl-sulfate is electrolyzed, in the electrolysis cell described in Example 19, in the presence of hydrogen at +88° C., with a hydrogen overvoltage of 500 mV, to a theoretical current conversion of 45%, based on the dinitrile. The suspension is filtered. 94% of the theoretical amount of PC to be expected from the amount of current passed are isolated from the filter cake.

(b) If the electrolysis is carried out at a hydrogen overvoltage of 1,200 mV, with the same amount of current, 89.5% of the theoretical yield of PC are obtained. The suspension obtained under these conditions is substantially easier to filter than that obtained as described under (a).

EXAMPLE 24

(a) A solution of 70.6 g of o-phthalodinitrile, 1.5 g of sodium propylate and 3.53 g of tetraethylammonium sulfate in 1,000 g of n-propanol is electrolyzed to a current conversion of 45%, based on o-phthalodinitrile, in the cell described in Example 19, but using a graphite anode, hydrogen being passed in at 88° C. and the hydrogen overvoltage being 600 mV.

The yield of PC is 90.5% of the amount theoretically expected from the current conversion.

(b) The procedure described under (a) is then repeated, but before the electrolysis the additives (Z) shown in the Table are added to the solution.

After a current conversion of 45% (based on o-phthalodinitrile), PC is isolated in the yield (in percent of the theoretical yield to be expected from the current conversion), shown in the Table.

| Additive (Z)<br>(to the propanol solution of a) | Yield<br>(%, based on current conversion) |
| --- | --- |
| a) — | 90.5 |
| b) 18 g of n-propyl acetate | 97.8 |
| c) 18 g of n-butyl propionate | 95.2 |
| d) 15 g of n-butyl acetate | 97.0 |
| e) 0.9 g of propyl acetate | 92.1 |
| f) 45 g of propyl acetate | 94.5 |
| g) 70 g of propyl acetate | 93.6 |
| h) 0.5 g of lead-II acetate | 95.0 |
| i) 0.5 g of lead-IV acetate | 95.1 |
| k) 1.0 g of lead-IV acetate | 94.6 |
| l) 2.0 g of lead-IV acetate | 90.6 |

EXAMPLE 25

(a) An electrolysis cell fitted with an RA2 cathode and a graphite anode (surface area: 50 cm$^2$) contains a solution of 70.6 g of o-phthalodinitrile, 1.5 g of sodium propylate, 3.53 g of tetraethylammonium sulfate and 18 g of n-propyl acetate in 1,000 g of n-propanol. The electrolysis is carried out at from 86 to 90° C., with a current density of 2,000 A/m$^2$ at the cathode and a hydrogen overvoltage of 600 mV, to a current conversion of 45% based on o-phthalodinitrile. The PC formed is then filtered off (Experiment 1). Yield: 97.4% of that theoretically expected from the current conversion.

(b) The spent o-phthalodinitrile, and the amount of n-propanol, sodium propylate and tetraethylammonium sulfate removed with the filter residue, are replaced in the filtrate from experiment 1 and the solution is electrolyzed in the above cell to a current conversion of 45% (based on o-phthalodinitrile). The PC is then isolated as described above (Experiment 2).

(c) The filtrate from Experiment 2 is made up as described under (b) and is re-electrolyzed, and this procedure is repeated 10 more times.

The yields of PC were determined in the 12 experiments.

| Experiment No. | Yield in % of the yield theoretically expected from the amount of current passed |
| --- | --- |
| 1 | 97.4 |
| 2 (filtrate from Experiment 1) | 97.0 |
| 3 (filtrate from Experiment 2) | 97.2 |
| 4 (filtrate from Experiment 3) | 96.8 |
| 5 (filtrate from Experiment 4) | 97.9 |
| 6 (filtrate from Experiment 5) | 97.1 |
| 7 (filtrate from Experiment 6) | 97.1 |
| 8 (filtrate from Experiment 7) | 96.2 |
| 9 (filtrate from Experiment 8) | 97.0 |
| 10 (filtrate from Experiment 9) | 97.6 |
| 11 (filtrate from Experiment 10) | 95.5 |
| 12 (filtrate from Experiment 11) | 96.8 |

We claim:

1. A process for the preparation of a metal-free phthalocyanine, wherein a solution or suspension of one or more aromatic o-dinitriles in a organic liquid is electrolyzed in the presence of hydrogen or of a compound which eliminates hydrogen under the reaction conditions, and in the presence of one or more alkaline compounds as activators, using electrodes which are inert under the reaction conditions, the hydrogen overvoltage at the cathode not exceeding 1,500 mV (measured against a reversible hydrogen electrode in a medium of the same composition as the reaction mixture) and the organic liquid containing small amounts of one or more dissolved electrolytically conductive compounds.

2. A process as claimed in claim 1, wherein the electrolysis is carried out at a hydrogen overvoltage of from 500 to 1,500 mV (measured against a reversible hydrogen electrode in a medium of the same composition as the reaction mixture).

3. A process as claimed in claim 1, wherein the organic liquid used is a primary, secondary or tertiary alkanol of 1 to 12 carbon atoms, an alkanediol of 2 to 6 carbon atoms, an alkanetriol of 3 to 6 carbon atoms, a polyalkanediol, where alkane is of 2 to 6 carbon atoms, a polyalkanetriol, where alkane is of 3 to 6 carbon atoms, a saturated cyclic ether of 4 or 5 carbon atoms, an N-alkylamide or N,N-bis-alkylamide, where alkyl is of 1 to 4 carbon atoms, of an aliphatic carboxylic acid of 1 to 3 carbon atoms, a lactam of 4 to 6 carbon atoms or its N-alkyl derivative, where alkyl is of 1 to 4 carbon atoms, or a mixture of these.

4. A process as claimed in claim 1, wherein the organic liquid used is an alkanol of 1 to 6 carbon atoms.

5. A process as claimed in claim 1, wherein the organic liquid used is an alkanol of 3 to 6 carbon atoms.

6. A process as claimed in claim 1, wherein the aromatic o-dinitrile used is derived from the benzene or naphthalene series, the benzene or naphthalene radical being unsubstituted or substituted by alkyl of 1 to 4 carbon atoms, phenyl, phenoxy, chlorine, bromine or nitro.

7. A process as claimed in claim 1, wherein the electrolytically conductive compound used is a tetraalkylammonium salt, tris(hydroxyalkyl)-alkylammonium salt or tetra(hydroxyalkyl)-ammonium salt, a salt of primary, secondary or tertiary alkylamine or hydroxyalkylamine, where alkyl is of 1 to 20 carbon atoms and hydroxyalkyl is of 2 or 3 carbon atoms, with hydrochloric acid, sulfuric acid, an alkanesulfonic acid of 1 to 8 carbon atoms, benzenesulfonic acid, an alkylbenzenesulfonic acid, where alkyl is of 1 to 9 carbon atoms, an alkylsulfuric acid, where alkyl is of 1 to 5 carbon atoms, or a monoalkylphosphoric or dialkylphosphoric acid, where alkyl is of 1 to 18 carbon atoms; an ammonium salt, alkali metal salt or alkaline earth metal salt of benzenesulfonic acid, of an alkylbenzenesulfonic acid, where alkyl is of 1 to 18 carbon atoms, of a naphthalenesulfonic acid, of an alkylnaphthalenesulfonic acid, where alkyl is of 1 to 8 carbon atoms, of an alkanesulfonic acid, where alkane is of 1 to 6 carbon atoms, of a chloroalkanesulfonic acid of 2 to 6 carbon atoms, of a hydroxyalkanesulfonic acid of 2 to 6 carbon atoms, of an alkylsulfuric acid of 1 to 6 carbon atoms, of a chloroalkylsulfuric acid of 2 to 6 carbon atoms, of a monoalkylphoshoric or dialkylphosphoric acid, where alkyl is of 1 to 18 carbon atoms, of a cyclic ester of boric acid with a 1,2-diol or 1,2-diol or of a dicarboxylic acid, of 4 to 6 carbon atoms, containing a sulfonic acid group; an alkanolate of 1 to 12 carbon atoms, glycollate of 2 to 6 carbon atoms, hydroxide, amide, sulfide, thiocyanate or cyanide of an alkali metal or alkaline earth metal; magnesium chloride or lithium chloride, or mixtures of the above.

8. A process as claimed in claim 1, wherein the electrolytically conductive compound used is the tetraethylammonium salt of ethylsulfuric acid, o- or p-toluenesulfonic acid, p-butylbenzenesulfonic acid or p-hexylbenzenesulfonic acid; the sodium or potassium salt of propanesulfonic acid, chloropropanesulfonic acid, butanesulfonic acid or hexanesulfonic acid; the sodium or potassium salt of β-hydroxyethanesulfonic acid, β-hydroxypropanesulfonic acid, β-hydroxybutanesulfonic acid or β-hydroxyhexanesulfonic acid; the potassium or sodium salt of methylsulfuric acid, ethylsulfuric acid, propylsulfuric acid, chloropropylsulfuric acid, butylsulfuric acid or hexylsulfuric acid (i.e. the salt of the sulfuric acid half-esters of ethanol, propanol, chloropropanol, butanol and hexanol, the sodium or potassium salt of sulfosuccinic acid, sodium hydroxide or potassium hydroxide.

9. A process as claimed in claim 1, wherein the electrolytically conductive compound is used in an amount of from 0.01 to 3% by weight, based on the organic liquid.

10. A process as claimed in claim 1, wherein the electrolytically conductive compound is used in an amount of from 0.1 to 1.0% by weight, based on the organic liquid.

11. A process as claimed in claim 1, wherein the activator used is an alkali metal amide, alkali metal alcoholate, alkali metal sulfide, alkali metal hydroxide, or alkali metal cyanide, an alkali metal salt of a monoalkylphosphoric or dialkylphoshoric acid, where alkyl is of 1 to 18 carbon atoms, an alkali metal salt of a monoalkyl ester or dialkyl ester of boric acid, where alkyl is of 1 to 18 carbon atoms, an alkali metal salt of a cyclic boric acid ester with a 1,2-diol or 1,3-diol, or an alkali metal salt of a dicarboxylic acid, of 4 to 6 carbon atoms, which contains a sulfonic acid group.

12. A process as claimed in claim 1, wherein the alkali metal salt used is the lithium, potassium or sodium salt.

13. A process as claimed in claim 1, wherein the activator is used in an amount of from 0.1 to 1.0% by weight, based on the organic liquid.

14. A process as claimed in claim 1, wherein an alkanol of 1 to 4 carbon atoms, formaldehyde, acetaldehyde or an alkali metal borohydride is used as the compound which eliminates hydrogen under the reaction conditions.

15. A process as claimed in claim 1, which is carried out in the presence of hydrogen.

16. A process as claimed in claim 1, wherein the electrolysis is carried out in the presence of from 0.5 to 5% by weight, based on the organic liquid, of an ester of an alkanol of 1 to 6 carbon atoms with a fatty acid of 2 to 4 carbon atoms, or in the presence of from 0.02 to 0.15% by weight, based on the organic liquid, of lead-II acetate or lead-IV acetate.

17. A process as claimed in claim 16, wherein an ester of an alkanol of 2 to 4 carbon atoms with acetic acid is used.

18. A process as claimed in claim 1, wherein the electrolysis is carried out at from 80° to 120° C., under atmospheric or superatmospheric pressure.

19. A process as claimed in claim 1, wherein the electrolysis is carried out to a current conversion of from 25 to 50%, based on the aromatic o-dinitrile.

* * * * *